Oct. 14, 1952   S. WAGNER ET AL   2,613,899
CHRISTMAS TREE STAND
Filed Feb. 15, 1950   2 SHEETS—SHEET 1

Inventors
Samuel Wagner &
Theodore K. Kellner
by *[signature]*   Attys

Oct. 14, 1952  S. WAGNER ET AL  2,613,899
CHRISTMAS TREE STAND
Filed Feb. 15, 1950  2 SHEETS—SHEET 2
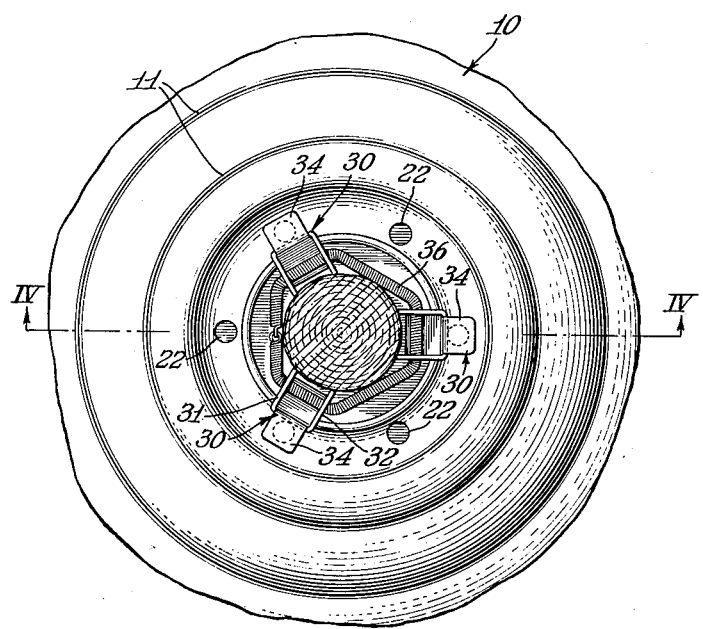
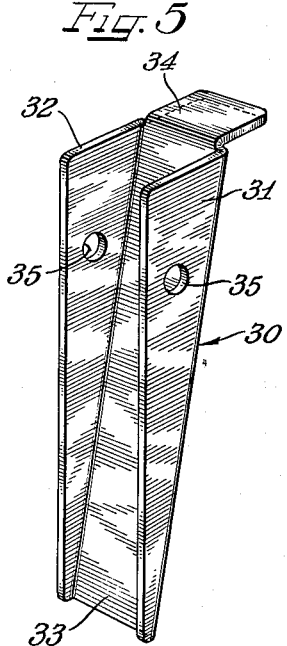
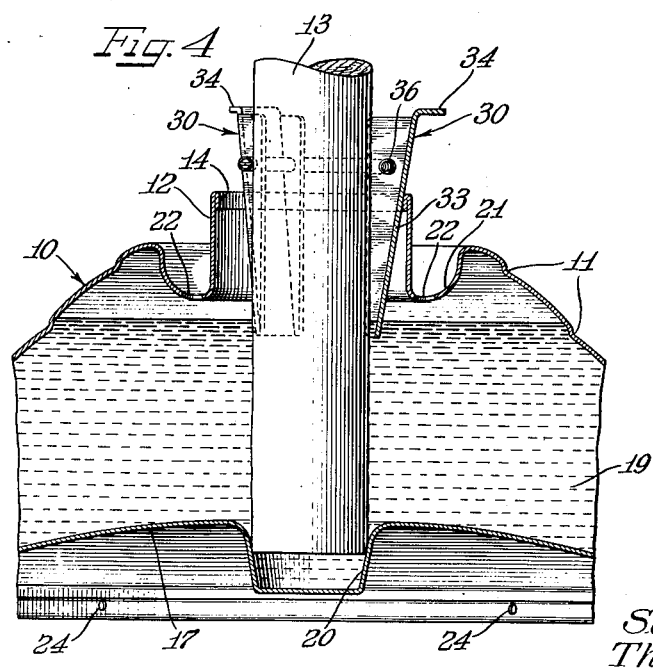
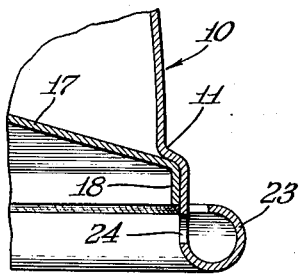
Inventors
Samuel Wagner &
Theodore K. Kellner
Attys Patented Oct. 14, 1952

2,613,899

UNITED STATES PATENT OFFICE 2,613,899

CHRISTMAS TREE STAND

Samuel Wagner and Theodore K. Kellner, Sheridan, Wyo.

Application February 15, 1950, Serial No. 144,282

4 Claims. (Cl. 248—44)

The present invention relates to a stand for supporting Christmas trees and the like. The stand of the present invention is characterized by inherent stability so that the tree supported within the stand is always held firmly in an upright position without a tendency to topple due to the weight of the tree and ornaments and accessories thereon.

Further, the stand of the present invention provides means for supplying water to the bark and cellular structure of the tree, thereby preventing the tree from drying out and causing its needles to shed or possibly create a fire hazard in the home.

The stand of the present invention comprises generally a hollow shell having supporting means for holding the trunk of the tree in rigid, upright position, the hollow shell being filled with water in contact with the trunk of the tree to prevent drying out. By the specific design of the tree stand of the present invention, a reservoir is provided for collecting any water which may be spilled during the filling of the shell. In addition, ventilating means are provided to aid in removing condensed moisture from the interior of the shell-like structure so that the floor area on which the stand is disposed will not become wet from condensed moisture.

With the foregoing in mind, an object of the present invention is to provide a support structure for a Christmas tree or the like which rigidly holds the tree in an upright position.

A further object of the present invention is to provide a support stand for a tree containing a fluid chamber for water to not only increase the mass of the support by serving as a ballast, but also to provide an ample source of water which can be absorbed by the tree to prevent its drying out.

Still another object of the present invention is to provide a tree support stand which can accommodate trees of different size.

Another object of the present invention is to provide a tree support structure with means thereon for collecting water which may collect on the sides of the support, and also having means for ventilating the interior of the support structure to minimize the amount of condensed moisture.

Another object of the present invention is to provide a support stand for a Christmas tree which may be manufactured inexpensively from ordinary metal stampings.

Other objects and features of the present invention will be apparent from a description of the attached sheets of drawings, in which:

Figure 3 is a fragmentary plan view similar to Figure 1 of a modified form of the present invention utilizing a different type of securing means for holding the tree within the stand;

Figure 4 is a fragmentary cross-sectional view with parts in elevation taken along the line IV—IV of Figure 3;

Figure 5 is a view in perspective of a wedge support member shown in Figures 3 and 4; and Figure 6 is an enlarged fragmentary view of the edge construction illustrated in Figure 2.

As shown on the drawings:

Figure 1:
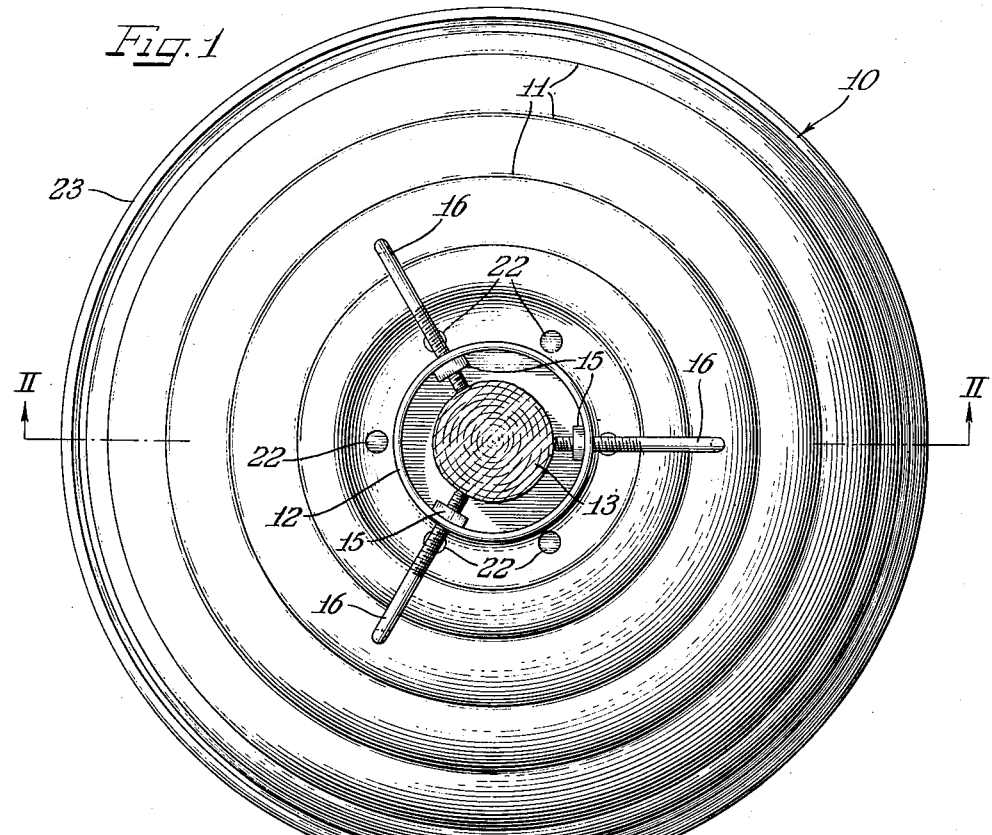
Figure 1 is a plan view of the support of the present invention illustrating the means by which the tree is held within the stand.
Figure 2:
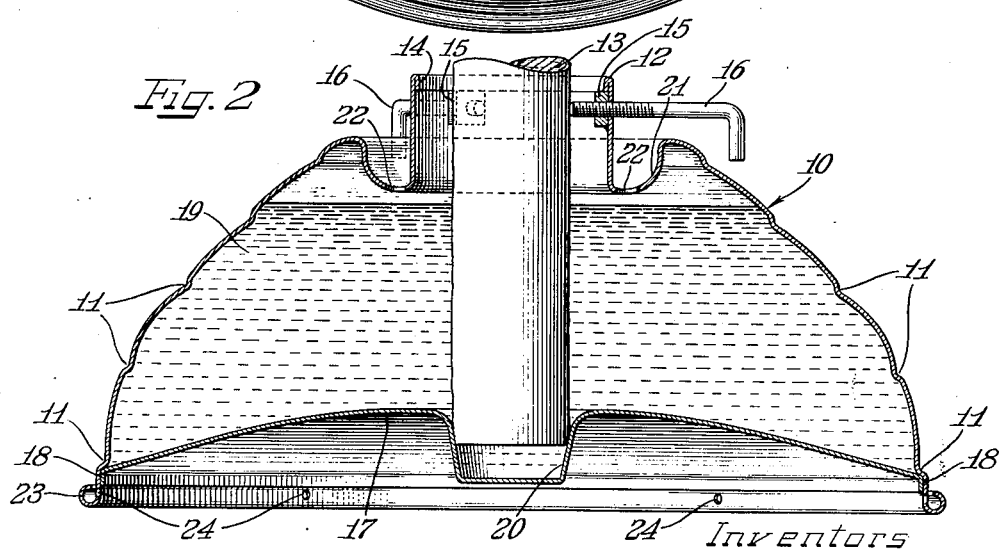
Figure 2 is a cross-sectional view with parts in elevation taken along the line II—II of Figure 1.

Reference numeral 10 denotes generally a shell having the shape of an inverted cup and provided with corrugations 11 intermediate the ends thereof. The corrugations 11 serve to strengthen the body of the shell 10, as well as providing a pleasing decorative appearance to the assembly.

The small diameter end of the cup-shaped shell 10 is provided with a circular flange 12 for receiving the trunk 13 of the Christmas tree to be supported. The uppermost edge of the flange 12 is bent inwardly as at 14 to provide a smooth surface and a plurality of nuts 15 are secured to the interior of the flange 12 as by welding or the like. The nuts 15 each receive a thumb screw 16 for adjusting the position of the trunk 13 within the interior of the flange 12.

Near the base of the shell 10, there is provided a support member 17 having a generally convex configuration. The peripheral edge of the plate 17 is turned downwardly as at 18 and nests within the lowermost of the corrugations 11 of the shell 10. The support plate 17 is secured to the shell 10, preferably by welding the edge 18 along the inner surface of the shell 10. The shell 10 in combination with the plate 17 thus define a substantially water-tight fluid compartment for holding a body of water 19 in contact with the trunk 13 of the tree.

The supporting plate 17 is also provided with a tapered recess 20 for receiving and accommodating the base of the trunk 13. By providing tapered walls which define the recess 20, as shown, tree trunks of different diameter may be easily accommodated.

To fill the interior of the fluid receptacle, the shell 10 is provided with a funneling groove 21 extending from the base of the central flange 12 upwardly to the sides of the shell 10. At spaced points along the funneling groove 21, there is provided a series of ports 22 disposed at the base of the groove 21. Thus, the interior of the shell may be filled by pouring water into the groove 21, and the amount of liquid which can be accommodated will be apparent as the level of the liquid rises above the level of the ports 22 and along the side walls of the groove 21.

In pouring water into the groove 21, a small amount may be unavoidably spilled along the shell 10. To avoid having this spilled water damage the floor surface on which the stand is disposed, the shell 10 is provided at its large diameter end with an inwardly rolled edge 23 which acts as a reservoir for droplets of water which may flow down along the sides of the shell 10.

Since the water 19 used in filling the stand will normally be a temperature substantially lower than the ambient temperature, there may be a tendency for moisture from the surrounding air to condense on the relatively cold surface of the underside of the plate 17. Droplets of moisture might then form on the underside of the plate 17 and drip to the floor beneath. To counteract this possibility, the shell 10 is provided with a plurality of apertures 24 at spaced points therearound, at the level of the rolled edge 23. This configuration is more clearly illustrated in Figure 6. The apertures 24 thus provide an access to circulating air, and air circulating along the base of the support plate 17 will pick up moisture therefrom and decrease the possibility of large droplets forming therealong.

The convex shape used for the plate 17 is important for another reason. Evergreen trees are capable of absorbing large quantities of water. However, in the supporting stand of the present invention, the supply of water is never completely depleted. It will be apparent that as the level of the water has dropped substantially, and begins to recede from the uppermost point of the convex supporting plate 17, the fluid will no longer be in contact with the bark of the trunk 13, and the only loss of water will be the negligible loss due to evaporation. In this condition, there is still sufficient water present at the base of the assembly to act as a ballast for the stand to prevent tipping of the stand due to the weight of the tree.

In the modification of the invention shown in Figures 3 to 5, we have provided a novel type of engaging means for holding the tree in an upright position. These engaging means consist of a plurality of wedge members 30 having triangular-shaped side walls 31 and 32 in spaced parallel relation and a side wall 33 therebetween. The side wall 33 extends from the apex to the base of the triangular side walls 31 and 32 and has an outwardly extending tab portion 34. Each of the side walls 31 and 32 is provided with an aperture 35 so that any number of the wedge members 30 may be resiliently secured together by means of a coil spring 36 which extends through the aperture 35 of the individual wedge members.

The triangular wedges 30 are inserted with the circular flange 12 before the tree is inserted into the stand. When the tree is positioned within the recess 20 of the support plate 17, each of the wedges may be forced downwardly or upwardly against the surface of the trunk 13, as desired, by shifting the tabs 34 to bring the tree into an upright position. The tabs 34 also prevent the wedges 30 from falling within the interior of the shell 10.

From the foregoing, it will be appreciated that we have herein provided a novel type of stand suitable for holding Christmas trees and the like rigidly in an upright position. The components of the stand assembly can be manufactured readily from ordinary sheet metal stampings and may be easily assembled. In addition, the stand includes a fluid chamber for providing a source of water to the bark of the tree and thereby prevents its drying out. The support stand is also provided with means for collecting water from the side walls of the stand and for minimizing the amount of condensed moisture around the walls of the fluid chamber.

It will be understood that modifications and variations may be effected without departing from the scope of the novel concepts of the present invention.

We claim as our invention:

1. A tree-supporting stand comprising an inverted generally frusto-conical cup-like shell having an upwardly extending flange for receiving the trunk of the tree and having a funnel depression at the base of said flange in circumscribing relation to said flange, said funnel depression having an aperture therein communicating with the interior of said shell, and a circular base portion having its outer periphery secured to said shell for receiving the base of said tree.

2. A tree-supporting stand comprising a corrugated support member in the form of an inverted generally frusto-conical shaped cup, said cup having a central flange portion at its small diameter extending upwardly therefrom for receiving the trunk of a tree, and having an inwardly rolled peripheral edge at its large diameter for supporting said stand, a circular convex plate having its peripheral edge secured to said shell above said rolled edge, said cup also having apertures adjacent said rolled edge for circulating air about the base of said plate.

3. A tree-supporting stand comprising a corrugated inverted generally frusto-conical shaped shell having a flange portion at its smaller diameter for receiving the trunk of a tree, means on said flange portion for holding said trunk therein, said shell having a funnel depression at the base of said flange with apertures therein communicating with the interior of said shell, said shell also having an inwardly rolled edge at its large diameter for supporting said stand, a supporting plate having its peripheral edge secured to the interior of said shell above said rolled edge, said plate having a generally convex surface extending inwardly from said peripheral edge and having a tapered depression at its center for receiving the base of the tree, said plate and said shell forming a substantially water-tight chamber for receiving water therein.

4. A tree-supporting stand comprising a generally frusto-conical cup-like shell having a circular flange portion at its small diameter for receiving the trunk of a tree, a circular support member secured to the interior of said shell and having a tapered recessed portion for receiving the base of the tree trunk, and a plurality of resiliently connected wedge members holding said trunk within said flange portion.

SAMUEL WAGNER.
THEODORE K. KELLNER.

REFERENCES CITED

The following references are of record in the file of this patent:

UNITED STATES PATENTS

| Number | Name | Date |
| --- | --- | --- |
| 1,598,016 | Runser | Aug. 31, 1926 |
| 1,750,367 | Smith | Mar. 11, 1930 |
| 2,044,192 | Templin | June 16, 1936 |
| 2,283,899 | Baker | May 26, 1942 |